United States Patent
Kuris et al.

(10) Patent No.: US 12,360,828 B2
(45) Date of Patent: Jul. 15, 2025

(54) EXPOSING A CLOUD API BASED ON SUPPORTED HARDWARE

(71) Applicant: Red Hat, Inc., Raleigh, NC (US)

(72) Inventors: Eran Kuris, Ra'anana (IL); Arie Bregman, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 446 days.

(21) Appl. No.: 17/387,726

(22) Filed: Jul. 28, 2021

(65) Prior Publication Data

US 2023/0031610 A1 Feb. 2, 2023

(51) Int. Cl.
*G06F 9/54* (2006.01)

(52) U.S. Cl.
CPC ............. *G06F 9/542* (2013.01); *G06F 9/547* (2013.01)

(58) Field of Classification Search
CPC ................................ G06F 9/542; G06F 9/547
See application file for complete search history.

(56) References Cited

U.S. PATENT DOCUMENTS

| | | | |
|---|---|---|---|
| 5,909,593 A * | 6/1999 | Abbondonzio | G06F 9/4411 713/1 |
| 9,661,064 B2 | 5/2017 | Kranz et al. | |
| 9,690,815 B2 | 6/2017 | Cronin et al. | |
| 9,729,506 B2 | 8/2017 | Call et al. | |
| 9,733,953 B2 | 8/2017 | Hall | |
| 10,033,833 B2 * | 7/2018 | Fu | G06F 9/45558 |
| 2014/0215312 A1 | 7/2014 | Hicks et al. | |
| 2015/0046583 A1* | 2/2015 | Celi, Jr. | H04L 43/04 709/224 |
| 2015/0195303 A1 | 7/2015 | Holden et al. | |
| 2016/0124742 A1 | 5/2016 | Rangasamy et al. | |
| 2016/0267153 A1* | 9/2016 | Witkop | G06F 16/285 |
| 2018/0210768 A1 | 7/2018 | Dai et al. | |

(Continued)

FOREIGN PATENT DOCUMENTS

| | | |
|---|---|---|
| CN | 109660392 | 4/2019 |
| WO | 20200190256 A1 | 9/2020 |

OTHER PUBLICATIONS

"WSO2 API Manager", located at https://wso2.com/api-manager/, Jun. 4, 2021; 6 pages.

(Continued)

*Primary Examiner* — Kevin L Young
*Assistant Examiner* — Kimberly L Jordan
(74) *Attorney, Agent, or Firm* — Womble Bond Dickinson (US) LLP (57) ABSTRACT

A system and method for exposing a cloud application programming interface (API) based on supported hardware of a cloud service system. The method includes executing a cloud service application to provide one or more services. The method includes maintaining, in a data storage, a plurality of linkages between a plurality of service identifiers corresponding to the one or more services of the cloud service application and a plurality of hardware identifiers. The method includes determining, based on the plurality of linkages and/or a hardware profile of the cloud service system, whether the cloud service system has a capability to provide access to the one or more services of the cloud service application. The method includes providing exposure to application programming interfaces (APIs) of at least one of the one or more services of the cloud service application.

17 Claims, 4 Drawing Sheets

(56) References Cited

U.S. PATENT DOCUMENTS

| | | | |
|---|---|---|---|
| 2018/0324062 A1* | 11/2018 | Chen | H04L 41/0816 |
| 2019/0028360 A1* | 1/2019 | Douglas | H04L 41/22 |
| 2019/0097900 A1* | 3/2019 | Rodriguez | G06F 11/301 |
| 2020/0162359 A1 | 5/2020 | Borkar et al. | |
| 2020/0249936 A1* | 8/2020 | Barfield, Jr. | G06F 8/60 |
| 2021/0064433 A1 | 3/2021 | Nakfour | |
| 2021/0294679 A1* | 9/2021 | Thakur | G06F 8/315 |
| 2022/0139143 A1* | 5/2022 | Avitan | G07D 7/17 |
| | | | 382/112 |

OTHER PUBLICATIONS

"Google Cloud APIs", located at https://cloud.google.com/apis/docs/overview, May 28, 2021; 4 pages.

Extended European Search Report mailed Feb. 25, 2022 for European Application No. 21198744.1.

\* cited by examiner

300 executing, by a cloud service system, a cloud service application to provide one or more services
302 maintaining, by the cloud service system in a data storage, a plurality of linkages between a plurality of service identifiers corresponding to the one or more services of the cloud service application and a plurality of hardware identifiers, each respective service identifier is associated with one or more hardware identifiers of the plurality of hardware identifiers
304 determining, by the cloud service system based on the plurality of linkages and a hardware profile of the cloud service system, whether the cloud service system has a capability to provide access to the one or more services of the cloud service application
306 providing, by the cloud service system to a client device responsive to determining whether the cloud service system has the capability to provide the access to the one or more services, exposure to application programming interfaces (APIs) of at least one of the one or more services of the cloud service application
308

EXPOSING A CLOUD API BASED ON SUPPORTED HARDWARE

TECHNICAL FIELD

The present disclosure relates generally to software technology, and more particularly, to systems and methods for exposure of application programming interfaces (APIs) of one or more services of a cloud service application based on the supported hardware of a cloud service system that executes the cloud service application.

BACKGROUND

Cloud service systems are infrastructure, platforms, or software that are hosted by third-party providers and made available to users through the internet. Cloud services facilitate the flow of user data from front-end clients (e.g. servers, tablets, desktops, laptops—anything on the client's end), through the internet, to the provider's systems, and back. Clients can access cloud services with nothing more than a computer, operating system, and internet connectivity or virtual private network (VPN).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

When operating a cloud service system, it is possible for customers to try to use a cloud service of the cloud API just to find out that the cloud service has failed to load in their computing environment and without any clear explanation as to why the cloud service has failed to load. For example, a developer may design a cloud service system to include a cloud service component of Single Root I/O Virtualization (SR-IOV), which allows a Peripheral Component Interconnect (PCI) Express device to present itself as several virtual network interface cards (NICs) to a hypervisor, and/or a service component of Data Plane Development Kit (DPDK), which allows for the offloading of data packet processing from an operating system kernel to processes running in user space. While these cloud service components will successful execute on the developer's computing hardware, the customers of the cloud service system are using an entirely different hardware platform that often lacks the appropriate computing hardware (e.g., processors, memory, storage, adapters) to successfully support the cloud services provided by the cloud service component. Thus, the execution of these cloud service components using the wrong hardware platform will cause the cloud service system to provide an inferior or non-operational service to the customer, which confuses the customer.

The confused customer will then send repeated requests for the cloud service system to provide the cloud service. These repeated requests; however, may overburden the network infrastructure by increasing network congestion and power consumption by the network infrastructure. The repeated requests may also reduce the capability for the cloud service system to provide cloud services to other customers because the cloud service system has to consume its resources (e.g., processing, power) to process each of these requests. In the end, the confused customer will open a ticket asking for technical support for why the cloud service is not working in their computing environment, which only further wastes valuable networking resources.

Aspects of the present disclosure address the above-noted and other deficiencies by exposing a cloud application programming interface (API) based on supported hardware of a cloud service system. Benefits of using the one or more embodiments of the present disclosure for exposing a cloud API based on supported hardware of a cloud service system may include a reduction in the amount of networking resources in order to provide cloud services, as well as, a decrease in network congestion and power consumption for the overall network infrastructure.

As discussed in greater detail below, a cloud service system may include a collection of interconnected cloud servers that each execute a cloud service application that is configured to provide one or more cloud services to one or more client devices. The cloud service system may receive a request from a client device for exposure to an application programming interface (API) of a particular service of the cloud service application. The cloud service system may maintain in a data storage (e.g., a memory, a database), a plurality of linkages between a plurality of service identifiers corresponding to the one or more services of the cloud service application and a plurality of hardware identifiers. Each respective service identifier is associated with one or more hardware identifiers of the plurality of hardware identifiers. The cloud service system may determine, based on the plurality of linkages and/or a hardware profile of the cloud service system, whether the cloud service system has a capability to provide access to the one or more services of the cloud service application. The cloud service system may provide, to a client device responsive to determining whether the cloud service system has the capability to provide the access to the one or more services, exposure (e.g., access, notifications, etc.) to application programming interfaces (APIs) of at least one of the one or more services of the cloud service application.

Figure 1:
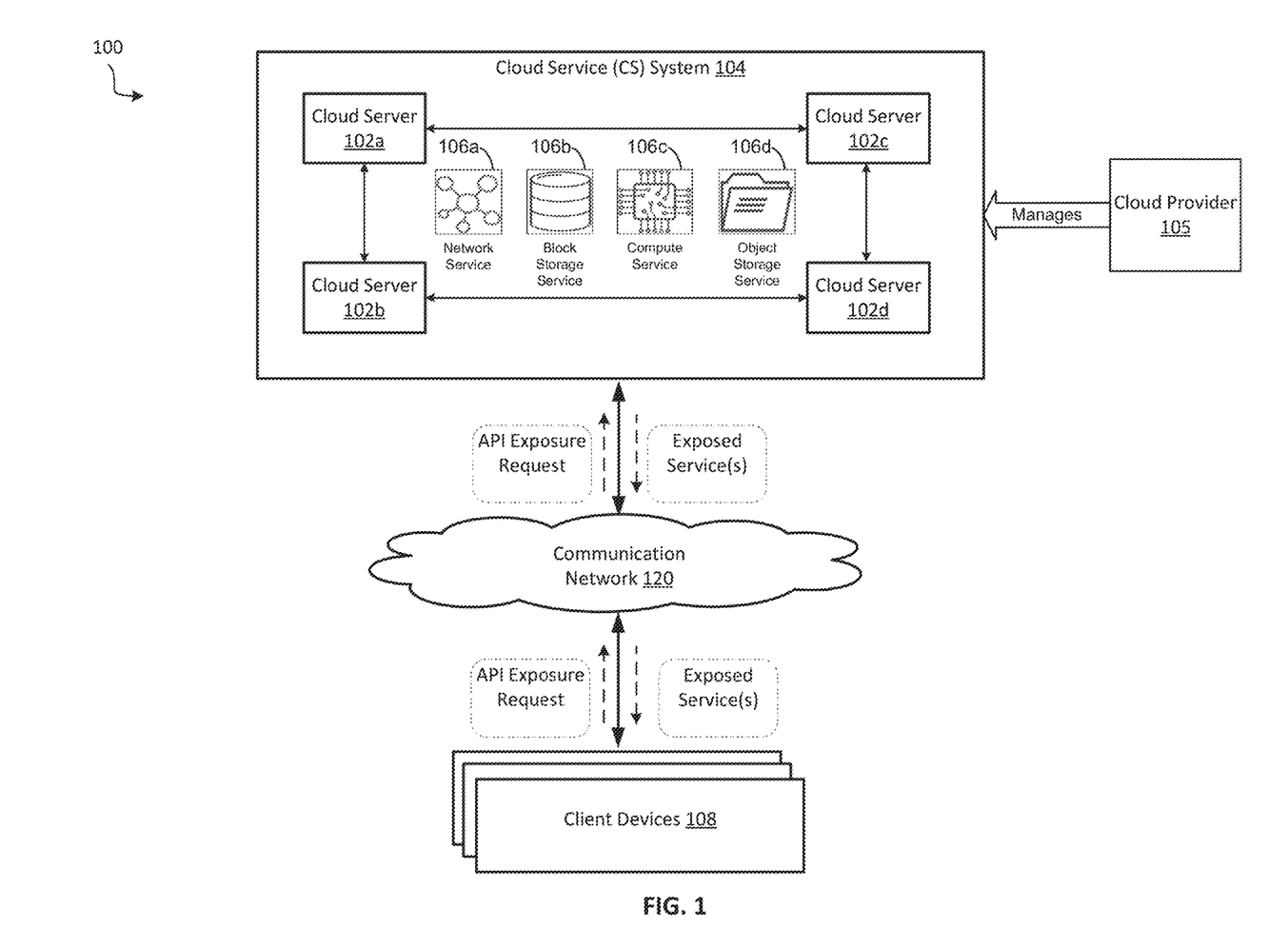
FIG. 1 is a block diagram depicting an example environment for exposing cloud application programming interface (API) based on supported hardware, according to some embodiments.

FIG. 1 is a block diagram depicting an example environment for exposing cloud application programming interface (API) based on supported hardware, according to some embodiments. The environment 100 includes a cloud service system 104 and a plurality of client devices 108 that are communicably coupled together via a communication network 120. The environment 100 includes a cloud provider 105 that manages (e.g., controls, operates) the cloud service system 104.

The communication network 120 may be a public network (e.g., the internet), a private network (e.g., a local area network (LAN) or wide area network (WAN)), or a combination thereof. In some embodiments, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g. cell towers), etc. The communication network 120 may carry communications (e.g., data, message, packets, frames, etc.) between any other the computing device.

The cloud service system 104 includes cloud servers 102a, 102b, 102c, 102d (collectively referred to as, "cloud servers 102") that are communicably connected to one another via the communication network 120 to form a cloud system for delivering services and/or computing resources (collectively referred to as, "services" or "cloud services") to the one or more client devices 108. As shown in FIG. 1, the cloud service system 104 may include cloud service components 106a, 106b, 106c, 106d (collectively referred to as, "cloud service components 106"), where cloud service component 106a is configured to provide a network service, cloud service component 106b is configured to provide a block storage service, cloud service component 106c is configured to provide a compute service, and cloud service component 106 is configured to provide an object storage service.

Although FIG. 1 shows that the cloud service system 104 includes a select number of cloud service components (e.g., cloud service components 106a, 106b, 106c, 106d) that are each configured to provide a particular type of cloud service, the cloud service system 104 may include any number of cloud service components for providing any type of cloud service. For example, the cloud service system 104 may include cloud service component 106 that is configured to provide networking services, block storage services, computing services, object storage services, database services, communication services, deployment and management services, monitoring services, telemetry services, queuing services, collaboration services, application services, and the like.

The cloud service system 104 may be any type of cloud service. In some embodiments, the cloud service system 104 may be an Infrastructure-as-a-Service (IaaS) that provides users with compute, networking, and storage resources. In some embodiments, the cloud service system 104 may be a Platform-as-a-Service (PaaS) that provides users with a platform on which applications can run, as well as the information technology (IT) infrastructure for it to run. In some embodiments, the cloud service system 104 may be a Software-as-a-Service (SaaS) that provides users with a cloud application, the platform on which it runs, and the platform's underlying infrastructure. In some embodiments, the cloud service system 104 may be a Function-as-a-Service (FaaS) that is an event-driven execution model that lets the developers build, run, and manage application packages as functions without maintaining the infrastructure.

A cloud server 102 may be any suitable type of computing device or machine that has a processing device, for example, server computers (e.g., an application server, a catalog server, a communications server, a computing server, a database server, a file server, a game server, a mail server, a media server, a proxy server, a virtual server, a web server), desktop computers, laptop computers, tablet computers, smartphones, set-top boxes, a graphics processing unit (GPU), etc. In some examples, a computing device may comprise a single machine or may include multiple interconnected machines (e.g., multiple servers configured in a cluster).

A cloud server 102 may be one or more virtual environments. In one embodiment, a virtual environment 113 may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.). The cloud service system 104 may use the same type or different types of virtual environments. For example, all of the cloud servers 102 may be VMs. In another example, all of the cloud servers 102 may be containers. In a further example, some of the cloud servers 102 may be VMs, other cloud servers 102 may be containers, and other cloud servers 102 may be computing devices (or groups of computing devices).

The client device 108 may be any suitable type of computing device or machine that has a processing device, for example, desktop computers, laptop computers, tablet computers, smartphones, set-top boxes, a graphics processing unit (GPU), etc. A client device 108 may be operated by a customer, an administrator/operator of the cloud service system 104, etc.

Still referring to FIG. 1, each of the cloud servers 102a may execute a cloud service application that is configured to provide one or more cloud services. The cloud service system 104 may receive a request (shown in FIG. 1 as, "API Exposure Request") from a client device 108 for exposure to an application programming interface (API) of a particular service of the cloud service application. The cloud service system 104 may maintain in a data storage (e.g., a memory, a database), a plurality of linkages between a plurality of service identifiers corresponding to the one or more services of the cloud service application and a plurality of hardware identifiers. Each respective service identifier is associated with one or more hardware identifiers of the plurality of hardware identifiers. The cloud service system 104 may determine, based on the plurality of linkages and/or a hardware profile of the cloud service system, whether the cloud service system 104 has a capability to provide access to the one or more services of the cloud service application. The cloud service system 104 may provide, to a client device responsive to determining whether the cloud service system has the capability to provide the access to the one or more services, exposure (shown in FIG. 1 as, "Exposed Service(s)") to application programming interfaces (APIs) of at least one of the one or more services of the cloud service application.

Although FIG. 1 shows only a select number of computing devices (e.g., cloud servers 102, client devices 108), the environment 100 may include any number of computing devices that are interconnected in any arrangement to facilitate the exchange of data between the computing devices.

Figure 2A:
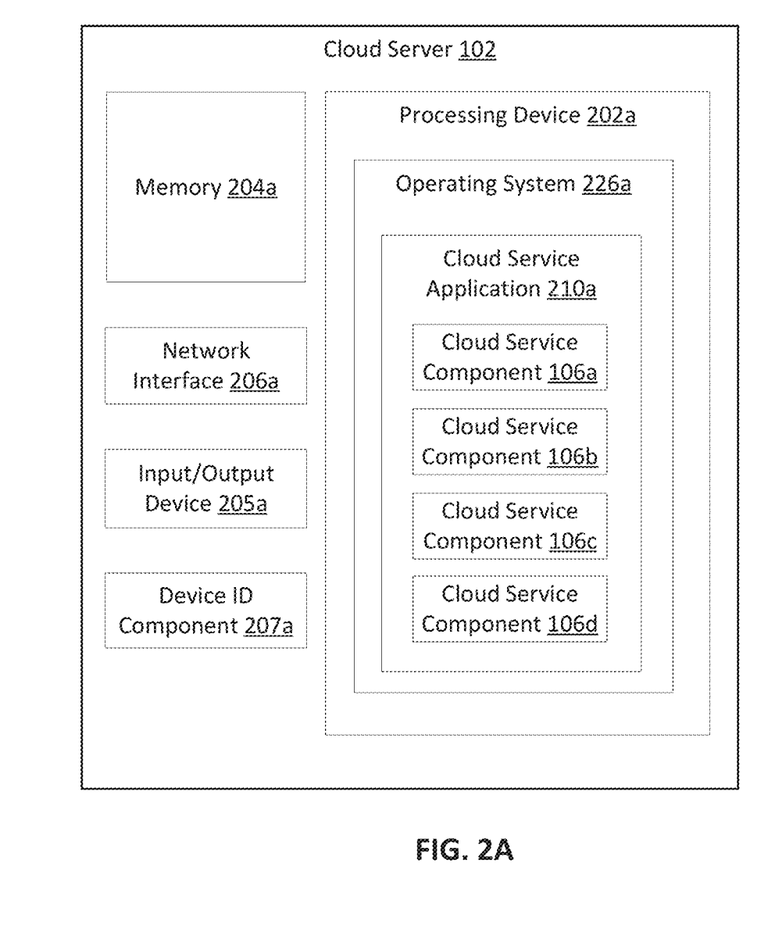
FIG. 2A is a block diagram depicting an example of the cloud server 102 in FIG. 1, according to some embodiments.

FIG. 2A is a block diagram depicting an example cloud server 102 of the cloud service system 104 in FIG. 1, according to some embodiments. While various devices, interfaces, and logic with particular functionality are shown, it should be understood that the one or more cloud servers 102 (e.g., cloud servers 102a-102d) of the cloud service system 104 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The cloud server 102 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the cloud server 102. In some embodiments, the processing device 202a and the memory 204a form various processing devices and/or circuits described with respect to the cloud server 102. The instructions include code from any suitable computer programming language such as, but not limited to, C, C++, C#, Java, JavaScript, VBScript, Perl, HTML, XML, Python, TCL, and Basic.

The processing device 202a may include and/or execute an operating system 226a that is configured to support basic functionality for the cloud server 102, such as scheduling tasks, executing applications, and controlling peripherals. In some embodiments, the operating system 226a may be any type of operating system (OS), such as any version of Microsoft Windows, Unix, Linux, Android, or macOS, etc.

The processing device 202a may include and/or execute a cloud service application 210a to run on and/or within the operating system 226a. The cloud service application 210a is configured to include and/or execute cloud service components 106a, 106b, 106c, 106d (collectively referred to as, "cloud service components 106") that are each configured to provide a respective cloud service (sometimes simply referred to as, "service") without direct active management by a user (e.g., a user of client device 108). For example, a cloud service component 106 may be configured to provide any type of cloud service, such as networking services, block storage services, computing services, object storage services, database services, communication services, deployment and management services, monitoring services, telemetry services, queuing services, collaboration services, application services, and the like. Although FIG. 2A shows only a select number of cloud service components 106 (e.g., cloud service components 106a, 106b, 106c, 106d); the cloud server 102 may include any number of cloud service components to provide any number of cloud services to one or more client devices 108.

In some embodiments, the cloud service application 210a may be configured to maintain (e.g., preserve, manage) in a data storage (e.g., memory 204a, a local or remote data storage), a plurality of linkages (e.g., associations) between a plurality of service identifiers corresponding to the one or more services of the cloud service application 210a and a plurality of hardware identifiers. In some embodiments, each respective service identifier may be associated with one or more hardware identifiers of the plurality of hardware identifiers. In some embodiments, a linkage may indicate that the service corresponding to the service identifier needs the one or more hardware components that correspond to the one or more hardware identifiers in order for the service to be able to successfully operate and provide the service to one or more client devices 108. In some embodiments, a service is able to successfully operate if the service is able to execute and operate at a performance level that meets the minimum performance level that is expected by a developer of the service.

In some embodiments, a hardware component may be any hardware component of a computer device, such as, a processor, memory, a storage device, an adapter (e.g., networking, audio, etc.), one or more ports/interfaces, a video graphics card, a motherboard, and/or the like. In some embodiments, a hardware identifier may identify the type of hardware, the version of the hardware, the model number of the hardware, the brand of the hardware, the specifications for the hardware (e.g., networking speed and/or bandwidth, processor speed, load balancing capabilities, multi-threading capabilities), a count of hardware components (e.g., a count of the processors), and/or the like.

In some embodiments, the cloud service application 210a may be configured to detect (e.g., sense, determine, notice) that the cloud service application 210a has been reconfigured (e.g., updated, modified, adjusted) to provide a different set of one or more services. For example, the cloud service application 210a may detect that the cloud service application 210a has been reconfigured to modify (e.g., adjust, alter, change) a service of the cloud service application 210a. As another example, the cloud service application 210a may detect that the cloud service application 210a has been reconfigured to remove or add a service to the cloud service application 210a. As another example, the cloud service application 210a may detect that an operability of a service has changed in that the service failed or recovered.

In some embodiments, the cloud service application 210a may be configured to update the plurality of linkages using one or more linkages corresponding to the different set of the one or more services. In some embodiments, the cloud service application 210a may be configured to receive (e.g., obtain, acquire, retrieve) an indication (e.g., a linkage) that a service has been updated to require more or less hardware components in order to be able to successfully operate and provide the service to one or more client devices 108. The cloud service application 210a may be configured to update, in response to receiving the indication, the plurality of linkages using the indication (e.g., linkage).

In some embodiments, the cloud service application 210a may be configured to determine, based on the plurality of linkages and/or a hardware profile of the cloud service system 104, whether the cloud service system 104 has a capability to provide access to the one or more services of the cloud service application 210a. In some embodiments, a capability to provide the access to the one or more services of the cloud service application 210a depends on whether one or more cloud servers 102 of the cloud service system 104 include the appropriate hardware to support the service.

In some embodiments, the cloud service application 210a may be configured to determine the particular hardware for supporting a service based on the linkage that corresponds to the service. In some embodiments, the cloud service application 210a is configured to detect the hardware profile of the cloud service system 104 by scanning the cloud service system 104 to detect the hardware profile of the cloud service system 104. In some embodiments, a hardware profile of the cloud service application 210a is a list that includes each of the hardware components included in the cloud service system 104.

In some embodiments, the cloud service application 210a may be configured to detect whether a triggering event has occurred. In some embodiments, the determining by the cloud service application 210a as to whether the cloud service application 210a has the capability to provide the access to the one or more services of the cloud service application is responsive to the cloud service application 210a detecting that a triggering event has occurred.

In some embodiments, the cloud service application 210a may be configured to detect that a triggering event has occurred if the cloud service application 210a detects a change (e.g., modification) in the hardware profile of the cloud service system 104. In some embodiments, the cloud service application 210a may detect a change in the hardware profile of the cloud service system 104 by determining that the cloud service system 104 has been reconfigured to remove or add a hardware component to the cloud service system 104. In some embodiments, the cloud service application 210a may detect a change in the hardware profile of the cloud service system 104 by detecting that an operability of a hardware component has changed in that the hardware component has failed or recovered.

In some embodiments, the cloud service application 210a may be configured to detect a change in the hardware profile of the cloud service system 104 by receiving an indication from the operating system 226a of a cloud server 102 that the hardware profile of the cloud server 102 has changed. In some embodiments, the cloud service application 210a may be configured to detect a change in the hardware profile of the cloud service system 104 by detecting a change in the hardware profile of the cloud service system 104 by scanning the cloud service system 104 to detect whether the hardware profile of the cloud service system 104 has changed.

In some embodiments, the cloud service application 210a may be configured to detect that a triggering event has occurred if the cloud service application 210a receives a request (shown in FIG. 1 as, "API exposure request") from the client device 108 for an exposure to an application programming interface (API) of a particular service of the cloud service application 210a. In some embodiments, the cloud service application 210a may be configured to detect that a triggering event has occurred if the cloud service application 210a detects that the cloud service application 210a has been reconfigured to provide a different set of one or more services, as compared to the one or more services that the cloud service application 210 was configured to provide prior to the reconfiguration.

In some embodiments, the cloud service application 210a may be configured to detect that a triggering event has occurred if a predetermined amount (e.g., hours, days, weeks) of time has elapsed. For example, the cloud service application 210a may be configured to detect the determining by the cloud service application 210a as to whether the cloud service application 210a has the capability to provide the access to the one or more services of the cloud service application on a periodic (e.g., hours, days, weeks) basis.

In some embodiments, the cloud service application 210a may be configured to provide, to the client device 108 via a message (shown in FIG. 1 as, "exposed service(s)"), exposure to application programming interfaces (APIs) of at least one of the one or more services of the cloud service application. In some embodiments, the cloud service application 210a may be configured to provide, to the client device 108, exposure to application programming interfaces (APIs) of at least one of the one or more services of the cloud service application in response to determining whether the cloud service system 104 has the capability to provide the access to the one or more services.

In some embodiments, the cloud service application 210a may be configured to determine, based on one or more linkages and/or the hardware profile of the cloud service system, that the cloud service system 104 has the capability to provide access to a first set (e.g., one or more) of the one or more services of the cloud service application 210a. In some embodiments, the cloud service application 210a may be configured to determine, based on a one or more linkages and/or the hardware profile of the cloud service system, that the cloud service system 104 lacks the capability to provide access to a second set of the one or more services of the cloud service application 210a. In some embodiments, the cloud service application 210a may be configured to provide, to the client device 108 responsive to determining the capability (and/or the lack of capability) to provide access to one or more services, access to APIs of the first set of the one or more services of the cloud service system without providing access to APIs of the second set of the one or more services of the cloud service application. In some embodiments, access to the one or more services means that the client device 108 may use the one or more services.

In some embodiments, the cloud service application 210a may be configured to send (e.g., transmit, provide, deliver) to the client device 108, a message indicating that the hardware profile of the cloud service system 104 does not support one or more services (sometimes referred to as, "a second set") of the cloud service application 210a in response to determining, based on a one or more linkages and/or the hardware profile of the cloud service system 104, that the cloud service system 104 lacks the capability to provide access to the one or more services of the cloud service application 210a.

In some embodiments, the cloud service application 210a may be configured to hide (e.g., block) the APIs of one or more services of the cloud service application 210a from the client device 108 to prevent (e.g., restrict) the client device 108 from accessing the APIs of the one or more services of the cloud service application 210a.

In some embodiments, the cloud service application 210a may be configured to send to the client device 108, a message that includes a list of services that are supported by the hardware profile of the cloud service system 104. In some embodiments, the list may include one or more services that are supported by the hardware profile of the cloud service system 104. In some embodiments, the message may include a list of the services that are not supported by the hardware profile of the cloud service system 104 and descriptions of the corresponding hardware components that are missing (or corrupted) from the hardware profile, thereby preventing the one or more services from successfully running on the cloud service system 104.

The cloud server 102 includes a network interface 206a configured to establish a communication session with a computing device for sending and receiving data over the communication network 120 to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the cloud server 102 includes a plurality of network interfaces 206a of different types, allowing for connections to a variety of networks, such as local area networks (public or private) or wide area networks including the Internet, via different sub-networks.

The cloud server 102 includes an input/output device 205a configured to receive user input from and provide information to a user. In this regard, the input/output device 205a is structured to exchange data, communications, instructions, etc. with an input/output component of the cloud server 102. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the cloud server 102, such as a built-in display, touch screen, microphone, etc., or external to the housing of the cloud server 102, such as a monitor connected to the cloud server 102, a speaker connected to the cloud server 102, etc., according to various embodiments. In some embodiments, the cloud server 102 includes communication circuitry for facilitating the exchange of data, values, messages, and the like between the input/output device 205a and the components of the cloud server 102. In some embodiments, the input/output device 205a includes machine-readable media for facilitating the exchange of information between the input/output device 205a and the components of the cloud server 102. In still another embodiment, the input/output device 205a includes any combination of hardware components (e.g., a touchscreen), communication circuitry, and machine-readable media.

The cloud server 102 includes a device identification component 207a (shown in FIG. 2A as device ID component 207a) configured to generate and/or manage a device identifier associated with the cloud server 102. The device identifier may include any type and form of identification used to distinguish the cloud server 102 from other computing devices. In some embodiments, to preserve privacy, the device identifier may be cryptographically generated, encrypted, or otherwise obfuscated by any device and/or component of cloud server 102. In some embodiments, the cloud server 102 may include the device identifier in any communication (e.g., exposed services) that the cloud server 102 sends to a computing device.

The cloud server 102 includes a bus (not shown), such as an address/data bus or other communication mechanism for communicating information, which interconnects the devices and/or components of cloud server 102, such as processing device 202a, network interface 206a, input/output device 205a, and/or device ID component 207a.

In some embodiments, some or all of the devices and/or components of cloud server 102 may be implemented with the processing device 202a. For example, the cloud server 102 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

Figure 2B:
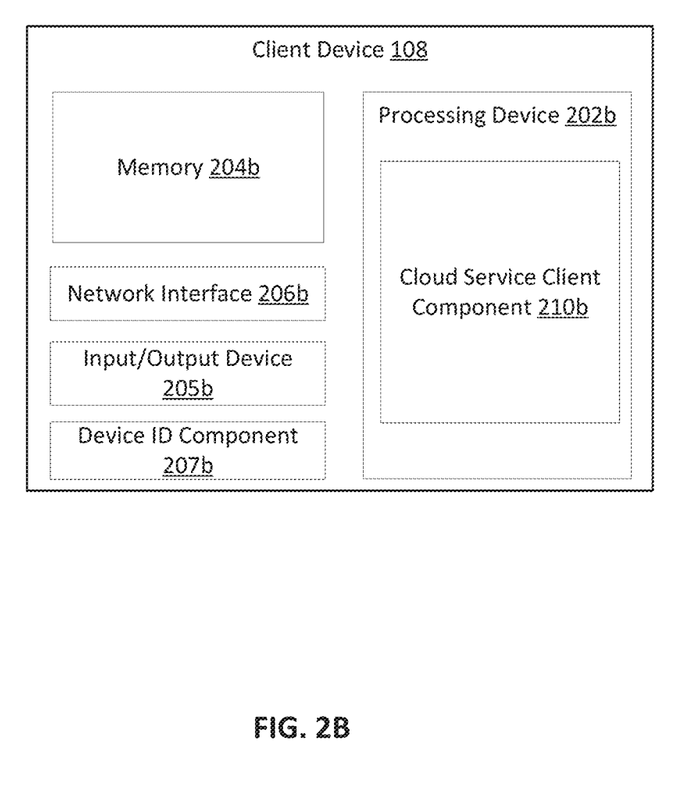
FIG. 2B is a block diagram depicting an example of the client device 108 of the environment in FIG. 1, according to some embodiments.

FIG. 2B is a block diagram depicting an example of the client device 108 of the environment in FIG. 1, according to some embodiments. While various devices, interfaces, and logic with particular functionality are shown, it should be understood that the client device 108 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The client device 108 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the client device 108 instead of devices and/or components of the cloud server 102.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the client device 108 instead of devices and/or components of the cloud server 102.

The processing device 202b may execute a cloud service client component 210b that may be configured to send a request (shown in FIG. 1 as, "API exposure request") to the cloud service system 104 for exposure to an application programming interface (API) of a particular service of the cloud service application 210a. In some embodiments, the cloud service client component 210b may be configured to receive, via a message (shown in FIG. 1 as, "exposed service(s)"), exposure to application programming interfaces (APIs) of at least one of the one or more services of the cloud service application 210a. In some embodiments, the cloud service client component 210b may be configured to receive access to application programming interfaces (APIs) of at least one of the one or more services of the cloud service application 210a. In some embodiments, the cloud service client component 210b may be configured to use the one or more services of the cloud service application 210a via the application programming interfaces (APIs) of the one or more services.

In some embodiments, the cloud service client component 210b may be configured to receive to the client device 108, a message that includes a list of services that are supported by the hardware profile of the cloud service system 210*a*. In some embodiments, the list may include one or more services that are supported by the hardware profile of the cloud service system 210*a*. In some embodiments, the message may include a list of the services that are not supported by the hardware profile of the cloud service system 210*a* and descriptions of the corresponding hardware components that are missing (or corrupted) from the hardware profile, thereby preventing the one or more services from successfully running on the cloud service system 210*a*.

The client device 108 includes a network interface 206*b* configured to establish a communication session with a computing device for sending and receiving data over a network to the computing device. Accordingly, the network interface 206*b* includes identical or nearly identical functionality as network interface 206*a* in FIG. 2A, but with respect to devices and/or components of the client device 108 instead of devices and/or components of the cloud server 102.

The client device 108 includes an input/output device 205*b* configured to receive user input from and provide information to a user. In this regard, the input/output device 205*b* is structured to exchange data, communications, instructions, etc. with an input/output component of the client device 108. The input/output device 205*b* includes identical or nearly identical functionality as input/output device 205*a* in FIG. 2A, but with respect to devices and/or components of the client device 108 instead of devices and/or components of the cloud server 102.

The client device 108 includes a device identification component 207*b* (shown in FIG. 2B as device ID component 207*b*) configured to generate and/or manage a device identifier associated with the client device 108. The device ID component 207*b* includes identical or nearly identical functionality as device ID component 207*a* in FIG. 2A, but with respect to devices and/or components of the client device 108 instead of devices and/or components of the cloud server 102.

The client device 108 includes a bus (not shown), such as an address/data bus or other communication mechanism for communicating information, which interconnects the devices and/or components of the client device 108, such as processing device 202*b*, network interface 206*b*, input/output device 205*b*, device ID component 207*b*, and the cloud service client component 210*b*.

In some embodiments, some or all of the devices and/or components of client device 108 may be implemented with the processing device 202*b*. For example, the client device 108 may be implemented as a software application stored within the memory 204*b* and executed by the processing device 202*b*. Accordingly, such embodiment can be implemented with minimal or no additional hardware costs. In some embodiments, any of these above-recited devices and/or components rely on dedicated hardware specifically configured for performing operations of the devices and/or components.

Figure 3:
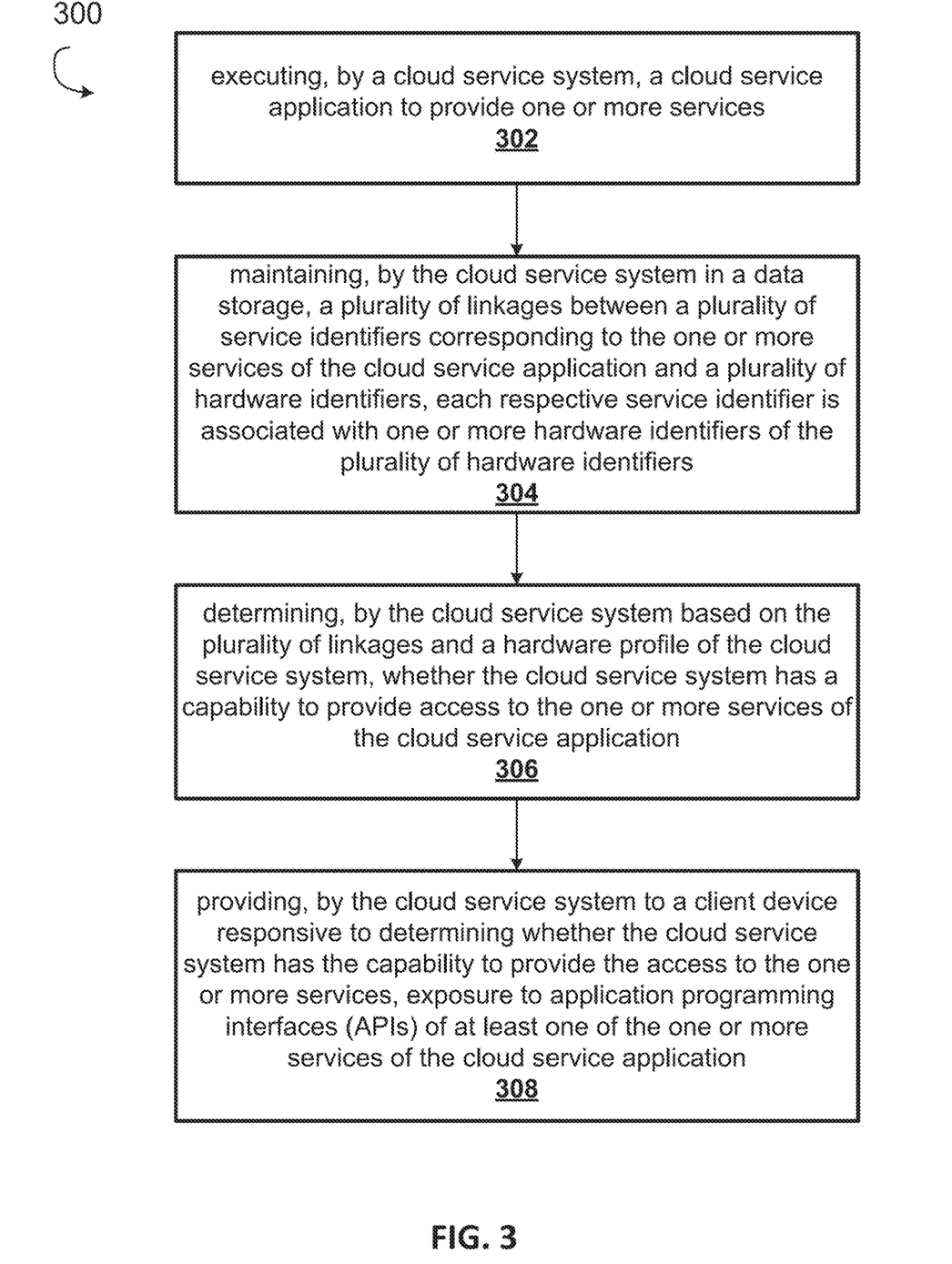
FIG. 3 is a flow diagram depicting a method for exposing a cloud application programming interface (API) based on supported hardware, according to some embodiments.

FIG. 3 is a flow diagram depicting a method for exposing cloud application programming interface (API) based on supported hardware, according to some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 300 may be performed by a cloud server, such as cloud server 102 in FIG. 1. In some embodiments, method 300 may be performed by a client device, such as client device 108 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of executing, by a cloud service system, a cloud service application to provide one or more services. The method 300 includes the block 304 of maintaining, by the cloud service system in a data storage, a plurality of linkages between a plurality of service identifiers corresponding to the one or more services of the cloud service application and a plurality of hardware identifiers, each respective service identifier is associated with one or more hardware identifiers of the plurality of hardware identifiers. The method 300 includes the block 306 of determining, by the cloud service system based on the plurality of linkages and a hardware profile of the cloud service system, whether the cloud service system has a capability to provide access to the one or more services of the cloud service application. The method 300 includes the block 308 of providing, by the cloud service system to a client device responsive to determining whether the cloud service system has the capability to provide the access to the one or more services, exposure to application programming interfaces (APIs) of at least one of the one or more services of the cloud service application.

Figure 4:
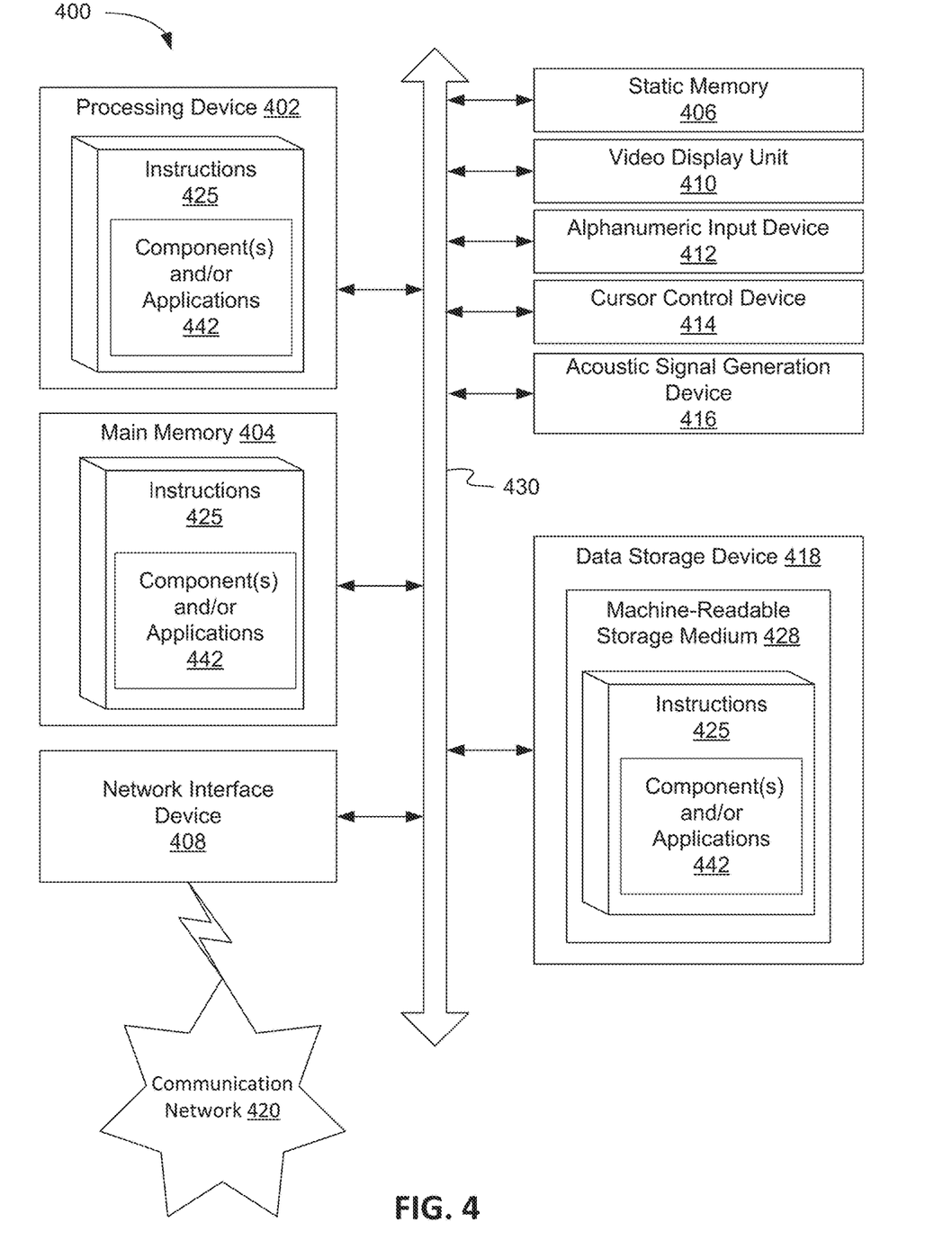
FIG. 4 is a block diagram of an example computing device that may perform one or more of the operations described herein, in accordance with some embodiments.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components and/or applications 442 (e.g., cloud service components 106a-106d in FIG. 2A, cloud service application 210 in FIG. 2A) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "executing," "determining," "establishing," "granting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    executing, by a cloud service system, a cloud service application to provide one or more services;
    maintaining, by the cloud service system in a data storage, a plurality of linkages between a plurality of service identifiers corresponding to the one or more services of the cloud service application and a plurality of hardware identifiers, each respective service identifier is associated with one or more hardware identifiers of the plurality of hardware identifiers;
    determining, by the cloud service system based on the plurality of linkages and a hardware profile of the cloud service system, whether the cloud service system has a hardware capability to provide access to the one or more services of the cloud service application;
    providing, by the cloud service system to a client device responsive to determining whether the cloud service system has the hardware capability to provide the access to the one or more services, exposure to application programming interfaces (APIs) of at least one of the one or more services of the cloud service application;
    determining that the cloud service system no longer has the hardware capability to provide access to the one or more services of the cloud service application;
    blocking, by the cloud service system, the APIs of the at least one of the one or more services of the cloud service application from the client device to prevent the client device from accessing the APIs of the at least one of the one or more services of the cloud service application responsive to determining that the cloud service system no longer has the hardware capability to provide access to the one or more services of the cloud service application; and
    sending, by the cloud service system to the client device, a message indicating a plurality of services that are not supported by the hardware profile and descriptions of one or more hardware components that are missing from the hardware profile to execute the plurality of services.

2. The method of claim 1, further comprising:
    detecting, by the cloud service system, the hardware profile of the cloud service system.

3. The method of claim 1, further comprising:
    detecting an occurrence of a triggering event, wherein the determining as to whether the cloud service application has the hardware capability to provide the access to the one or more services of the cloud service application is responsive to detecting the occurrence of the triggering event.

4. The method of claim 3, further comprising:
    detecting, by the cloud service system, the occurrence of the triggering event by detecting a change in the hardware profile of the cloud service system.

5. The method of claim 4, further comprising:
    detecting, by the cloud service system, the change in the hardware profile by receiving an indication from an operating system of the cloud service system that the hardware profile of the cloud service system has changed.

6. The method of claim 4, further comprising:
    detecting, by the cloud service system, the change in the hardware profile by scanning the cloud service system to detect whether the hardware profile of the cloud service system has changed.

7. The method of claim 3, further comprising:
    detecting, by the cloud service system, the occurrence of the triggering event by receiving a request from the client device for exposure to an application programming interface (API) of a particular service of the cloud service application.

8. The method of claim 4, further comprising:
    detecting, by the cloud service system, the occurrence of the triggering event by detecting that the cloud service application has been updated to provide a different set of the one or more services.

9. The method of claim 1, wherein providing exposure to the APIs of at least one of the one or more services comprises:
    determining, by the cloud service system based on the plurality of linkages and the hardware profile of the cloud service system, that the cloud service system has the hardware capability to provide access to a first set of the one or more services of the cloud service application;
    determining, by the cloud service system based on the plurality of linkages and the hardware profile of the cloud service system, that the cloud service system lacks the hardware capability to provide access to a second set of the one or more services of the cloud service application; and
    providing, by the cloud service system to the client device, access to APIs of the first set of the one or more services of the cloud service system without providing access to APIs of the second set of the one or more services of the cloud service application.

10. The method of claim 1, wherein maintaining the plurality of linkages in the data storage comprises:
    detecting, by the cloud service system, that the cloud service application has been updated to provide a different set of the one or more services; and
    updating, by the cloud service system, the plurality of linkages using one or more linkages corresponding to the different set of the one or more services.

11. A cloud service system comprising:
a data storage; and
a processing device, operatively coupled to the data storage, to:
- execute a cloud service application to provide one or more services;
- maintain, in the data storage, a plurality of linkages between a plurality of service identifiers corresponding to the one or more services of the cloud service application and a plurality of hardware identifiers, each respective service identifier is associated with one or more hardware identifiers of the plurality of hardware identifiers;
- determine, based on the plurality of linkages and a hardware profile of the cloud service system, whether the cloud service system has a hardware capability to provide access to the one or more services of the cloud service application;
- provide, to a client device responsive to determining whether the cloud service system has the hardware capability to provide the access to the one or more services, exposure to application programming interfaces (APIs) of at least one of the one or more services of the cloud service application;
- determine that the cloud service system no longer has the hardware capability to provide access to the one or more services of the cloud service application;
- block, by the cloud service system, the APIs of the at least one of the one or more services of the cloud service application from the client device to prevent the client device from accessing the APIs of the at least one of the one or more services of the cloud service application responsive to determining that the cloud service system no longer has the hardware capability to provide access to the one or more services of the cloud service application; and
- send, by the cloud service system to the client device, a message indicating a plurality of services that are not supported by the hardware profile and descriptions of one or more hardware components that are missing from the hardware profile to execute the plurality of services.

12. The cloud service system of claim 11, wherein the processing device is further to:
detect an occurrence of a triggering event, wherein the determining as to whether the cloud service application has the hardware capability to provide the access to the one or more services of the cloud service application is responsive to detecting the occurrence of the triggering event.

13. The cloud service system of claim 12, wherein the processing device is further to:
detect the occurrence of the triggering event by detecting a change in the hardware profile of the cloud service system.

14. The cloud service system of claim 13, wherein the processing device is further to:
detect the change in the hardware profile by receiving an indication from an operating system of the cloud service system that the hardware profile of the cloud service system has changed.

15. The cloud service system of claim 13, wherein the processing device is further to:
detect the change in the hardware profile by scanning the cloud service system to detect whether the hardware profile of the cloud service system has changed.

16. The cloud service system of claim 12, wherein the processing device is further to:
detect the occurrence of the triggering event by receiving a request from the client device for exposure to an application programming interface (API) of a particular service of the cloud service application.

17. A non-transitory computer-readable medium storing instructions that, when executed by a processing device of a cloud service system, cause the processing device to:
- execute, by the processing device, a cloud service application to provide one or more services;
- maintain, in a data storage, a plurality of linkages between a plurality of service identifiers corresponding to the one or more services of the cloud service application and a plurality of hardware identifiers, each respective service identifier is associated with one or more hardware identifiers of the plurality of hardware identifiers;
- determine, based on the plurality of linkages and a hardware profile of the cloud service system, whether the cloud service system has a hardware capability to provide the access to the one or more services of the cloud service application;
- provide, to a client device responsive to determining whether the cloud service system has the hardware capability to provide the access to the one or more services, exposure to application programming interfaces (APIs) of at least one of the one or more services of the cloud service application;
- determine that the cloud service system no longer has the hardware capability to provide access to the one or more services of the cloud service application;
- block, by the cloud service system, the APIs of the at least one of the one or more services of the cloud service application from the client device to prevent the client device from accessing the APIs of the at least one of the one or more services of the cloud service application responsive to determining that the cloud service system no longer has the hardware capability to provide access to the one or more services of the cloud service application; and
- send, by the cloud service system to the client device, a message indicating a plurality of services that are not supported by the hardware profile and descriptions of one or more hardware components that are missing from the hardware profile to execute the plurality of services.

* * * * *